Figure 1:
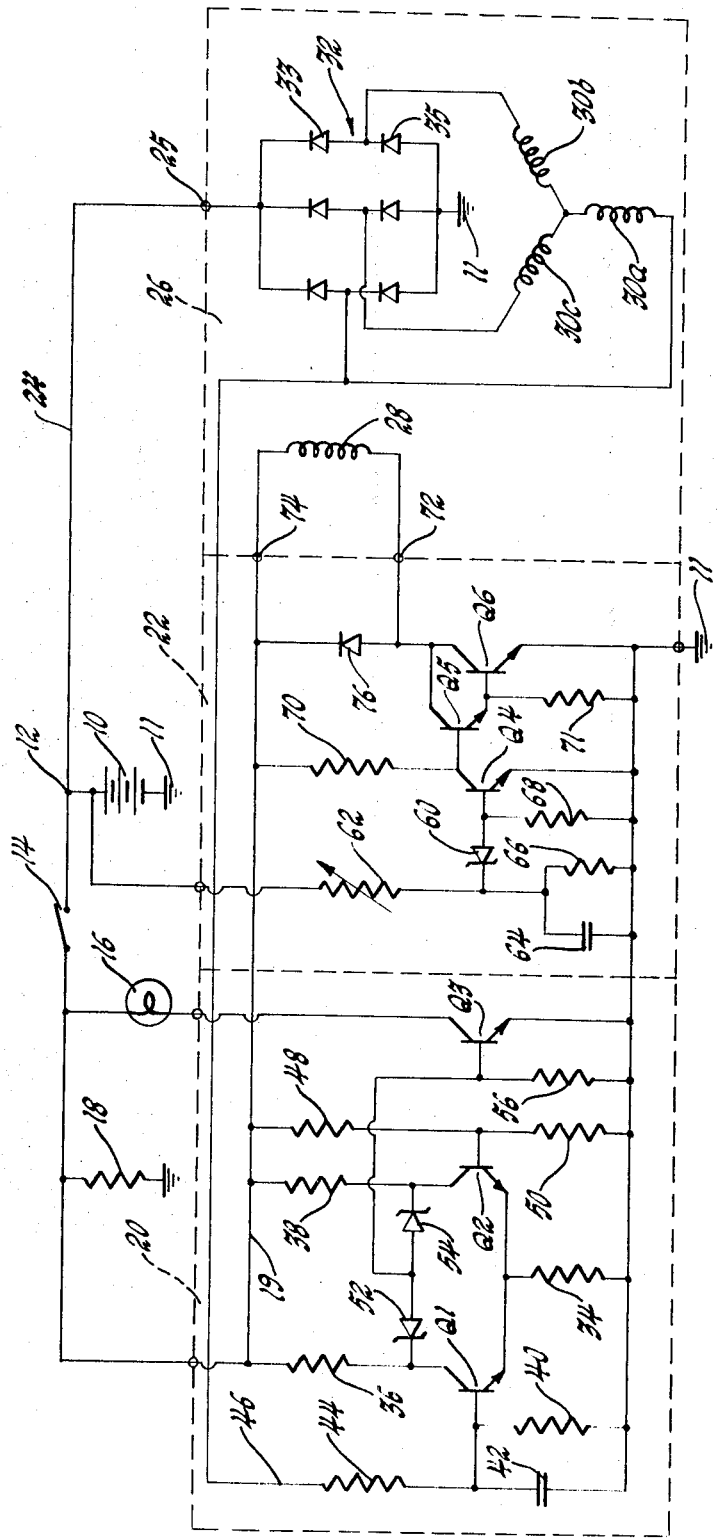

United States Patent
Ruff

[15] 3,656,135
[45] Apr. 11, 1972

[54] FAULT INDICATOR CIRCUIT FOR VEHICULAR BATTERY CHARGING SYSTEMS

[72] Inventor: Donald O. Ruff, Anderson, Ind.
[73] Assignee: General Motors Corporation, Detroit, Mich.
[22] Filed: Apr. 29, 1970
[21] Appl. No.: 32,850

[52] U.S. Cl. ........................................340/248 A, 340/249
[51] Int. Cl. .....................................................G08b 21/00
[58] Field of Search............340/248 R, 248 A, 248 B, 248 C, 340/249

[56] References Cited

UNITED STATES PATENTS

| | | | |
|---|---|---|---|
| 3,178,698 | 4/1965 | Graham | 340/248 |
| 3,457,560 | 7/1969 | McKinley | 340/248 C |
| 3,195,043 | 7/1965 | Burig et al. | 340/258 C |
| 3,488,650 | 1/1970 | Muchnick | 340/248 A |
| 3,293,630 | 12/1966 | McKaig | 340/248 C |
| 3,321,754 | 5/1967 | Grimm et al. | 340/249 |

*Primary Examiner*—David L. Trafton
*Attorney*—E. W. Christen, C. R. Meland and Albert F. Duke

[57] ABSTRACT

First and second Zener diodes respectively connecting first and second output terminals of a differential amplifier to the base of a transistor, the collector of which is connected to an indicator lamp and the emitter of which is grounded. One input to the differential amplifier is connected to a point in the charging system for the vehicle battery such as the output winding of an alternator, and the other input is connected to a reference potential that varies with the rectified output voltage of the alternator. When the output of the charging system varies from predetermined levels, one or both of the Zener diodes break down to bias the transistor into conduction, thereby illuminating the lamp. Otherwise the Zeners effectively remove the bias voltage from the base of the transistor keeping it off.

3 Claims, 2 Drawing Figures

PATENTED APR 11 1972

3,656,135

INVENTOR.
Donald O. Ruff
BY
Albert F. Duke
ATTORNEY

FAULT INDICATOR CIRCUIT FOR VEHICULAR BATTERY CHARGING SYSTEMS

The present invention relates to an improved fault indicator circuit for a system charging a vehicle battery.

Circuits employed to indicate faults occurring in the electrical systems of vehicles often require little gain, if any, if the faults to be monitored are gross such as a loose battery cable, a loose generator cable, an inoperative regulator, etc. However, as the use of semiconductor components and integrated circuits increase in vehicles and as the quantity and complexity of electrical systems also increase, the tolerances allowable for various individual electrical parameters decrease. The effects of such smaller faults on the characteristics of the overall electrical system may nevertheless be serious enough to warrant that their presence should be indicated. For instance, a fault in any of the many diodes in the system should be detected because it might result in an unacceptable change in charging voltage or could even allow the battery to drain. With fault detector circuits having low gain, the small change in voltage as may be caused by a faulty diode might not be detected until after the vehicle became disabled, and therefore a higher gain detector might be required. But, as the number of possible faults to be detected increase and the sensitivity required to detect them also increases, the means to attain greater sensitivity should not by themselves introduce new sources of fault or substantial extra expense. Instead of sensing each fault as for instance with a separate transistor driving a separate relay, it is desirable to have one circuit capable of detecting most, if not all, of such faults.

The circuit of the present invention provides such a fault indicator. It has a gain sufficiently high to detect most minor faults and yet does not require separate discrete components for detection of each fault. A further advantage is that the circuit is configured to be readily integrated and fabricated on the same substrate chips containing the voltage regulator for the battery charging system.

The circuit operates an indicator lamp when the rectified output voltage of the alternator contains an AC ripple amplitude above a predetermined amount or the DC level falls outside a predetermined range. Sensitivity to these and other sources of malfunctions in the charging system is afforded in the circuit of the present system by a differential amplifier the outputs of which are connected by resistors to the rectified output of the alternator and by Zener diodes to the base of a transistor that controls current through an indicator lamp. One input to the differential amplifier is connected to a point in the charging system that has an average DC voltage that is normally a constant percentage of the output of the charging system, this input being called the sense input. The other input to the differential amplifier is connected into a voltage divider that is connected across the output terminals of the alternator rectifier bridge, this input being called the reference input. When there are no faults to be detected in the charging system, the two inputs of the differential amplifier are balanced with each other. The two outputs are also balanced and then have a voltage less than the breakdown voltage of the Zeners. The voltage drop across the Zeners when thus blocking during no-fault operation is sufficient to isolate the base of the transistor connected with the indicator lamp and block the flow of standby current through the transistor and lamp.

Faults in the circuits comprising the charging system of the vehicle or in the battery terminal voltage cause slight differences between the inputs of the differential amplifier, and these differences produce amplified unbalances in the voltages appearing at the output terminals of the amplifier. Then, as one output voltage decreases the other increases to break down the Zener connecting it to the indicator transistor and thereby communicating at least a portion of the amplified unbalance to the base of the indicator transistor. For example, in the presence of a fault in the alternator, regulator, or rectifier circuits comprising the charging system, the voltage communicated to the sense input of the differential amplifier is altered from its balanced value to increase one output, break down the Zener associated with it, and consequently bias the indicator transistor into conduction.

In addition to isolating the indicator transistor from the output voltages of the differential amplifier associated with normal performance and shifting part of the amplified unbalance to the indicator transistor in the presence of a fault, the Zeners serve yet a third function. This is to allow the output terminals of the amplifier to be used to detect an overvoltage output from the alternator. Such a condition, since it could occur with improper temperature compensation or with the application of a full field excitation as when there is a loose sense lead between the battery and the voltage regulator, is one of the primary faults to be detected and has often required a separate detection circuit therefor. But with the present circuit one or both of the Zeners connected with the output of the differential amplifier break down in the presence of an overvoltage to in turn cause the indicator lamp to illuminate.

It is therefore a general object of the present invention to provide a fault indicator circuit employing a differential amplifier to detect one class of faults at one of its inputs, another class of faults at its second input, and a third class of faults at its outputs.

It is another and more specific object of the present invention to provide a circuit of the foregoing type to detect faults in the charging system of a vehicle where one input to the differential amplifier detects drops in the output voltage of an alternator for a vehicle and the other input detects faults at a point in the alternator system varying with the output thereof.

It is a further object of the present invention to provide a fault indicator circuit of the foregoing type wherein overvoltage conditions associated with the charging system of a vehicle battery are detected through the output terminals of a differential amplifier.

It is a further and more limited object of the present invention to provide a fault indicator circuit of the foregoing type where the collectors of the transistors comprising the differential amplifier and also one side of the indicator lamp are energized through an ignition switch from the positive terminal of the battery, thereby allowing the integration of all transistors and Zeners onto the same chips from which the voltage regulator of the battery charging system are made.

Figure 2:
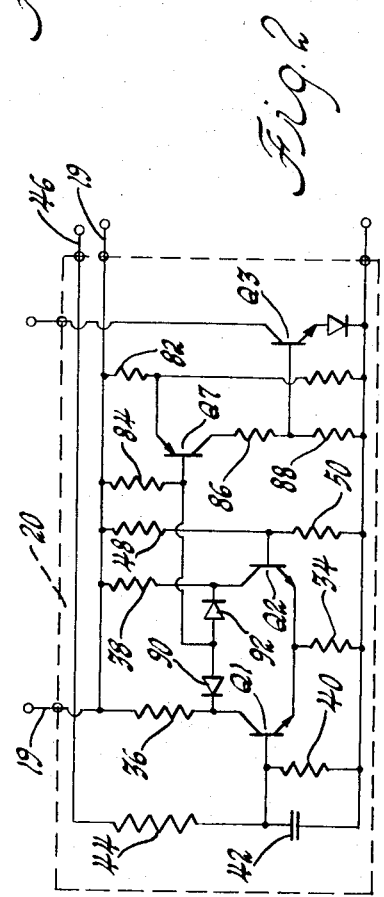

These and other objects of the present invention will be apparent from the description below taken with reference to the following drawings wherein:

FIG. 1 is a schematic representation of a preferred embodiment of a fault indicator circuit which obtains the features of the present invention; and FIG. 2 is schematic representation of an alternative embodiment affording greater sensitivity.

Referring now to FIG. 1, battery 10 has a positive terminal 12 that is shown connected by ignition switch 14 to indicator lamp 16 and ignition loads 18 and therefrom by conductor 19 to indicator circuit 20 and regulator 22. Battery terminal 12 is also connected by cable 24 to output terminal 25 of alternator 26 generally comprised of a rotating field winding 28 that excites stator windings 30a, 30b, and 30c. The outputs of windings 30a, 30b, and 30c are connected to respective legs of full-wave bridge rectifier 32 comprising positive diodes 33 and negative diodes 35.

Indicator circuit 20 is comprised of differentially-connected transistors Q1 and Q2, indicator transistor Q3, resistors 34, 36, 38, 40, 44, 48, 50 and 56; capacitor 42; and Zener diodes 52 and 54. The emitters of transistors Q1 and Q2 are grounded through resistor 34, and the collectors serving as the output terminals of the differential amplifier are connected to conductor 19 through resistors 36 and 38 respectively. The base of transistor Q1 is connected both to resistor 40 and capacitor 42 comprising an RC filter and also via resistor 44 and conductor 46 to output winding 30a, thereby providing what is known as a "sense" input to Q1. This input could also be connected to other points in the regulation and charging system as long as the DC voltage at such points remains constant in the absence of malfunction and is a known proportion of the alternator output voltage. The base of transistor Q2 is and connected to a node formed between voltage dividing resistors 48 and 50 connected in series between conductor 19 and ground, thereby providing what is known as a "reference" input to Q2. The DC voltage at this input remains within a specified range in the absence of malfunctions.

The values of resistors 48 and 50 are normally selected so that, with normal satisfactory operation of the charging system and battery, the reference input to the Q2 base balances a sense input to the Q1 base. Moreover, resistor 40 and capacitor 42 are selected to attenuate the ripple on the sense input to a magnitude well within the dynamic range of differentially connected Q1 and Q2. Finally, resistors 34, 36, and 38 are selected so that the peak voltages on the Q1 and Q2 collectors under balanced operation are slightly less than the voltages required to break down Zeners 52 and 54. Zener diodes 52 and 54 have their cathodes connected respectively to the collectors of Q1 and Q2 and their anodes connected to the base of Q3, the collector of which is connected to indicator lamp 16 and the emitter of which is grounded.

As is known in the art, resistor 34 being connected in common in the emitter circuits of both Q1 and Q2 functions as a common feedback to both transistors whereby current flow through either one of the transistors provides voltage across the resistor 34 in a direction to negatively bias the other transistor and reduce current flow therethrough. Consequently, if the potential introduced at the base of transistor Q1 is greater than that introduced at the base of Q2, an increased current will flow through transistor Q1 and a decreased current will flow through Q2. The opposite obtains if the potential introduced at the base of Q2 exceeds that introduced at the base of Q1. Thus, a change in the input to the base of either Q1 or Q2 causes the voltage on the corresponding collector to change in the opposite direction by a significantly greater amount, the magnitude of which is determined by the effect of both the changed input and the changed feedback on the voltage-current characteristics of the transistors.

A table listing typical values of the components of the fault indicator circuit 20 shown in FIG. 1 follows.

TABLE OF VALUES

| Resistors | | Semiconductors | |
|---|---|---|---|
| R34 | 660 ohms | Q1 | 2N3569 B=225 at 20 ma |
| R36 | 2200 ohms | Q2 | 2N3569 B=225 at 20 ma |
| R38 | 2200 ohms | Q3 | 2N3569 |
| R40 | 47000 ohms | Zener 52 | 8.2 volts |
| R44 | 2700 ohms | Zener 54 | 8.2 volts |
| R48 | 4700 ohms | C42 | 22 mfd. |
| R50 | 2200 ohms | | |
| R56 | 1000 ohms | | |

Completing the charging system for battery 10, a typical regulator 22 would be required to control the magnitude of current through field coil 28 in response to the output of either the alternator or the battery terminal voltage. Thus, regulator 22 is comprised of a Zener 60, transistor Q4 and Darlington-connected output transistors Q5 and Q6. The cathode of Zener 60 is connected to battery terminal 12 by resistor 62 and an RC filter comprising capacitor 64 and resistor 66. The anode of Zener 60 is referenced from ground by resistor 68 and is also connected to the base of transistor Q4, the emitter of which is grounded and the collector of which is connected both to battery terminal 12 through resistor 70 and to the base of transistor Q5. The collector of Q6 is connected by slip ring 72 to one side of field coil 28, the other side of which is connected by slip ring 74 to battery terminal 12 via conductor 19.

To enhance producibility of indicator circuit 20 transistors Q1, Q2, and Q3 as well as transistors Q4, Q5, and Q6 of regulator 22 are selected to be of the same type semiconductor devices, here npn, so that these transistors as well as Zeners 52, 54, and 60 may be made on the same semiconductor chip or chips.

Operation of detector circuit 20 comprised of components having relative values as indicated will now be described under four typical fault situations. In the first case, the alternator due to a malfunction in either regulator or alternator produces an overvoltage tending to overcharge the battery. The voltages on the collectors of both Q1 and Q2 are accordingly increased in correspondence with the overvoltage as are also the magnitudes on sense and reference inputs. While the increase in base biases may be equal so as to maintain the differential amplifier in balance, the output voltages at the collectors, however, would increase to exceed the break down voltages of Zeners 52 and 54. Upon such an occurrence, base drive would be provided to indicator transistor Q3 across resistor 56 from the conductor 19 through both resistor 36 and Zener 52 and also through resistor 38 and Zener 54. Current would then be drawn from battery terminal 12 through lamp 16 and through the Q3 collector-to-emitter junction to ground 11.

In the second case the AC component of the sense input exceeds a predetermined level as might be caused by an open stator winding especially with increasing loads or where the sense input is connected to the neutral point of the Y connected windings. The voltages induced in the individual stator windings by an open winding would become unbalanced or unsymmetrical as they adjust to the different load, and the new voltage in the individual windings would therefore have a higher AC component than before the fault. This increase in AC component of the voltage as sensed on stator winding 30a would be applied to the sense input of the differential amplifier where it would cause the voltages on the collectors of Q1 and Q2 to alternate between greater peaks so as to alternately break down the Zeners connected to the collectors. As with the case of overvoltage, indicator transistor Q3 would be biased on, but this time alternately first via resistor 36 through Zener 52 and then via resistor 38 and Zener 54.

In another fault mode an open stator winding or an open or shorted rectifier diode would result in an increase or decrease in the DC level of the sense input. This would unbalance the differential amplifier so that the amplifier output voltage at the Q2 collector would increase to break down Zener 54 and supply base drive to Q3 from conductor 19 through resistor 38 and Zener 54.

In the fourth mode of fault operation, the output of the alternator exceeds the terminal voltage of the battery by more than a predetermined amount as might be produced by a loose cable between the alternator and battery. As a result the sense input to Q1 would then exceed the reference input to Q2 so that the amplifier output voltage at the Q2 collector would increase to break down Zener 54 and thereby allow Q3 to be biased on via resistor 38 and Zener 54.

An alternative embodiment of indicator circuit 20 is shown in FIG. 2, wherein the connection of a pnp amplifier stage Q7 is connected between the collector outputs of the differential amplifier and the base of the indicator transistor Q3. The emitter and base of transistor Q7 are biased from the system voltage on conductor 19 through resistors 82 and 84 respectively and the Q7 collector is connected to the base of Q3 through voltage dividing resistors 86 and 88. Diodes 90 and 92 have their cathodes connected to the collectors of Q1 and Q2 respectively and their anodes connected in common to the base of Q3.

While the preferred embodiment of the subject invention is described above, it will be apparent to those skilled in the art that the invention may be practiced by other configurations. For instance, an emitter follower might be added ahead of Q1 so that the size of the filter might be reduced, or a Darlington-connected indicator stage might be employed instead of Q3. Moreover, the sense input might be taken at other points in the charging system having a DC potential bearing a known relationship to the output of the alternator.

Other modifications and changes may be made by those skilled in the art without departing from my invention, and I aim, therefore, in the appended claims to cover such modifications and changes as fall within its true spirit and scope.

What I claim as new and desire to secure by letters of patent of the United States is:

1. In a charging system for a battery of a vehicle said system comprising an alternator having a plurality of output windings and a full wave rectifier connected with said output windings and having an output terminal, a fault indicator circuit comprising:
   a. indicator means connected with said output terminal of said rectifier;
   b. a transistor of one conductivity type interconnected with said indicator means for controlling the energization of said indicator means;
   c. a differential amplifier including a pair of transistors of said one conductivity type and having first and second input terminals and first and second output terminals;
   d. means providing a reference voltage at said first differential amplifier input terminal;
   e. means including filter means connecting said second differential amplifier input to one of said output windings, the AC signal at said winding in the absence of a fault having and average DC voltage which bears a predetermined relationship to the DC voltage at said rectifier output terminal and is substantially equal to said reference voltage and provides at said first and second differential amplifier output terminals a voltage less than a predetermined voltage;
   f. means connecting said rectifier output terminal to said differential amplifier output terminals and providing at said amplifier output terminals a substantially DC voltage that in the absence of a fault is less than said predetermined voltage; and
   g. first and second Zener diodes connecting respective ones of said differential amplifier output terminals to said transistor and responsive to the voltage at one of said first and second differential amplifier output terminals for activating said transistor when said voltage at either one of said amplifier output terminals exceeds said predetermined voltage, whereby said indicator means is activated to indicate a fault.

2. In a charging system for a battery of a vehicle said system comprising an alternator having a plurality of output windings and a full wave rectifier connected with said output windings and having an output terminal, a fault indicator circuit comprising:
   a. indicator means connected with said output terminal of said rectifier;
   b. a transistor connected with said indicator means;
   c. a differential amplifier having first and second input terminals and first and second output terminals;
   d. means providing a reference voltage at said first differential amplifier input terminal;
   e. means connecting said second differential amplifier input terminal with a junction of one of said windings and said rectifier, the AC signal at said junction having an average DC voltage that in the absence of a fault bears a predetermined relationship to the voltage at said rectifier output terminal and is substantially equal to said reference voltage and provides at said first and second differential amplifier output terminals a voltage less than a predetermined voltage;
   f. means including a resistor connecting said rectifier output terminal to each said differential amplifier output terminal and providing at each said amplifier output terminal a substantially DC voltage that in the absence of a fault is less than said predetermined voltage; and
   g. first and second constant impedance breakdown devices each having a cathode connected respectively with said first and second differential amplifier output terminals, and an anode connected with said transistor, said devices responsive to the voltages at said first and second differential amplifier output terminals to activate said transistor when said voltage at either one of said first and second amplifier output terminals exceeds said predetermined voltage, whereby said indicator is activated to indicate a fault.

3. In a charging system for a battery of a vehicle said system comprising an alternator having a plurality of output windings and a full wave rectifier connected with said output windings and having an output terminal, a fault indicator circuit comprising:
   a. indicator means connected with said output terminal of said rectifier;
   b. a first transistor connected with said indicator means;
   c. a differential amplifier having first and second input terminals and first and second output terminals;
   d. means providing a reference voltage at said first differential amplifier input terminal;
   e. means including filter means connecting said second differential amplifier input terminal to one of said output windings, the AC signal at said winding in the absence of a fault having an average DC voltage which bears a predetermined relationship to the DC voltage at said output terminal of said rectifier and is substantially equal to said reference voltage and provides at said first and second differential amplifier output terminals of said amplifier a voltage less than a predetermined voltage;
   f. means including a resistor connecting said rectifier output terminal to each said differential amplifier output terminal and providing at said output terminal a substantially DC voltage that in the absence of a fault is less than said predetermined voltage; and
   g. means comprising a second transistor connected with said first transistor and first and second diodes the cathodes of which are connected respectively with said first and second output terminals of said differential amplifier and the anodes of which are connected with said first transistor whereby said indicator means are activated when the voltage at either one of said output terminals of said differential amplifier is above a predetermined voltage.

* * * * *